United States Patent [19]
Hek

[11] 3,832,005
[45] Aug. 27, 1974

[54] LOADER

[75] Inventor: Homer C. Hek, Alexandria, Va.

[73] Assignee: Universal Dynamics Corporation, Woodbridge, Va.

[22] Filed: May 24, 1972

[21] Appl. No.: 256,270

[52] U.S. Cl............ 302/59, 55/302, 34/10, 34/57 R
[51] Int. Cl............................................ B65g 53/40
[58] Field of Search............... 34/10, 15, 53, 54, 56, 34/57 R, 57 A, 92, 191, 242; 417/315; 432/15, 58; 23/288 S; 222/195, 193, 200; 141/7, 8, 59, 64, 65; 214/18; 302/62; 55/302, 283, 273, 272

[56] References Cited
UNITED STATES PATENTS

| | | | |
|---|---|---|---|
| 2,765,047 | 10/1956 | Hersey, Jr. | 55/302 |
| 2,796,950 | 6/1957 | Hersey, Jr. | 55/302 |
| 3,169,038 | 2/1965 | Pendleton | 302/59 |
| 3,219,394 | 11/1965 | Moss et al. | 302/59 |
| 3,273,943 | 9/1966 | Russell | 302/59 |
| 3,297,370 | 1/1967 | Moriarity | 55/302 |
| 3,431,026 | 3/1969 | Russell | 302/59 |
| 3,513,638 | 5/1970 | Young | 55/302 |
| 3,580,644 | 5/1971 | Ballard | 302/59 |
| 3,597,850 | 8/1971 | Jenkins | 34/10 |
| 3,612,616 | 10/1971 | Stewart | 302/59 |
| 3,667,814 | 6/1972 | Krivda | 302/62 |

FOREIGN PATENTS OR APPLICATIONS

| | | | |
|---|---|---|---|
| 939,641 | 10/1963 | Great Britain | 55/302 |
| 951,780 | 4/1964 | Great Britain | 55/302 |
| 700,483 | 12/1964 | Canada | 55/302 |

Primary Examiner—William E. Wayner
Assistant Examiner—Paul Devinsky
Attorney, Agent, or Firm—William D. Stokes

[57] ABSTRACT

A loader of the type particularly useful in a dryer of the type which includes a vacuum operated loading chamber is disclosed. Material is drawn into the loading chamber through the action of a vacuum which is drawn on the loading chamber. The vacuum line, which is connected to the chamber, operates through a filter which prevents the material to be loaded from entering the vacuum line. In accordance with the present invention, the vacuum line is caused to operate through a pneumatic switch which periodically reverses the flow of air through the filter thus cleaning it. The cleaning or blowback operation is an improvement over prior art systems which perform the operation of reversing the air current to clean the filter by stopping the motor which was driving the vacuum blower and electrically reversing it. Thus, the present invention greatly increases system life by eliminating the wear and tear concomitant with the braking, reversing and restarting of the blower motor.

11 Claims, 8 Drawing Figures

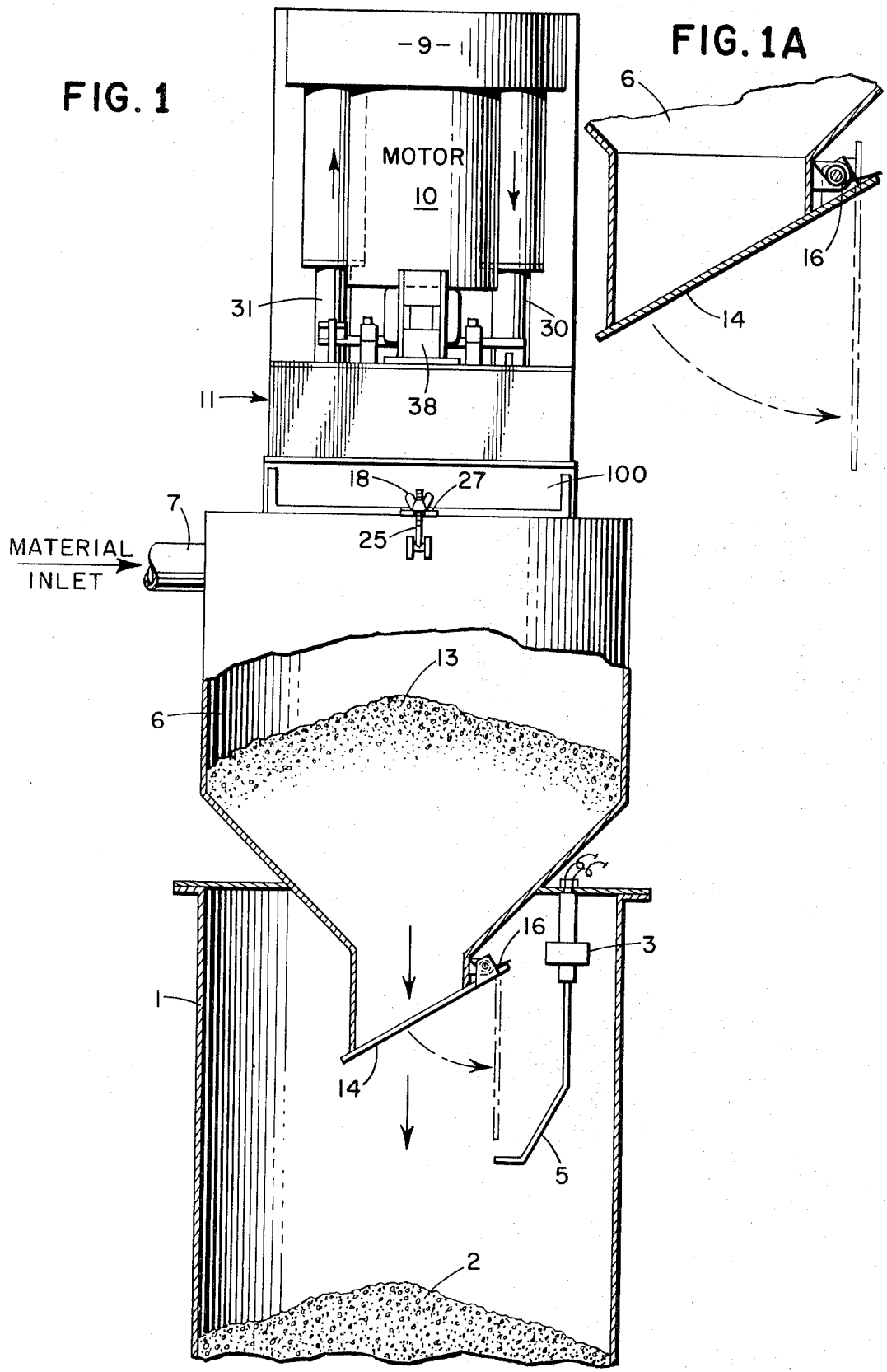

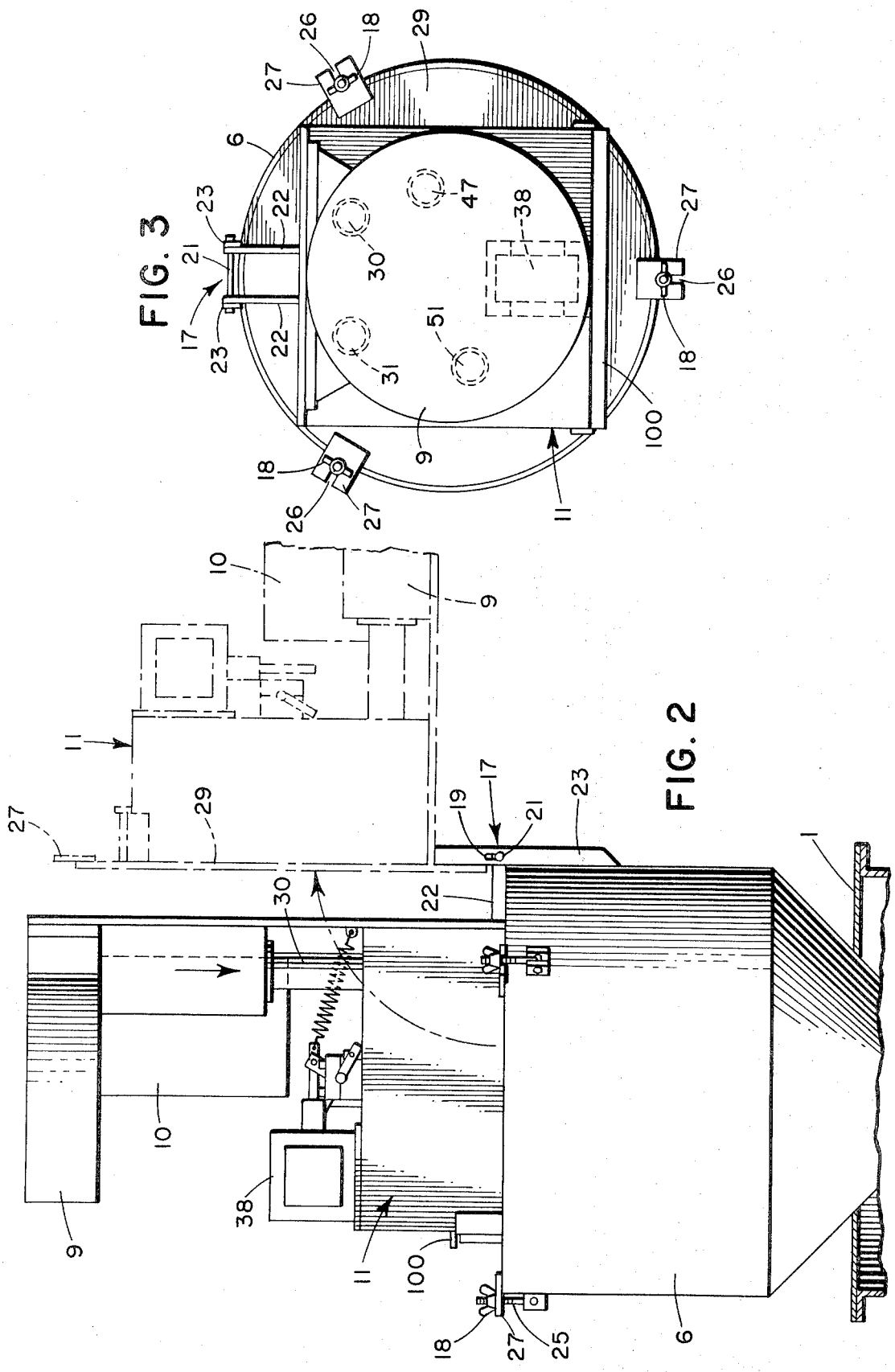

1
LOADER

The present invention relates to an improved vacuum loader for particulate material. More particularly, the invention is concerned with a new vacuum loading apparatus which is especially useful for loading particulate material into a dryer body for drying.

In conventional systems, the particulate material is moved pneumatically through a material line into a vacuum chamber. The material line is supplied by a box, commonly referred to as a gaylord, loaded with material to be dried. Pneumatic drive is provided by a vacuum pump which is connected to the chamber through a vacuum line. As the vacuum pump draws a vacuum on the chamber, material is forced from the gaylord into the material line and then into the chamber. In order to prevent the material from entering the vacuum line, a filter is provided at the orifice on the chamber where the vacuum line connects with the chamber.

As the vacuum is drawn, material is sucked into the line through which it travels until it enters the chamber, where it enters near the top and falls by gravity to the bottom of the chamber. When the weight of material in the vacuum chamber is sufficient and the vacuum is released, the bottom of the chamber will open and the accumulated material will be caused to drop into the body of the hopper dryer. Inside the hopper dryer, the wet particulate material is dried through the action of hot air currents which circulate through it. A sophisticated hopper dryer of this type is disclosed in copending U.S. Pat. application, Ser. No. 240,539 filed Apr. 3, 1972, now U.S. Pat. No. 3,793,742, in which Applicant is a co-inventor.

In practice, it is found that during the loading operation particulate material tends to accumulate on the filter, thus inhibiting the efficiency of the loading operation. Thus, after the vacuum loading has been permitted to occur for a period of time, the air flow in the vacuum line is reversed and the filter is cleaned by blowing air back through the vacuum line. The reversal of the air flow in the vacuum line is accomplished by electrically reversing the direction of the motor which drives the pump. Reversing the motor electrically, is a very expensive and time consuming operation. When the motor is turning in one direction, the source of electrical power to the motor must be stopped and the motor must be braked. Braking the motor, besides requiring extra apparatus which requires constant maintenance, care and frequent replacement has the added undesirable feature of putting a mechanical strain on the motor, thus reducing its life. After the motor has been stopped it must then be restarted in the opposite direction. This is accomplished by again applying electrical power to the pump motor. During starting, due to the fact that the motor is not rotating, the resistance presented by its windings is very low, and excessive current will flow during the starting operation. Thus, it is seen that every time the motor is restarted, the excessive current flowing during the initial portion of the start cycle will cause wear on all electrical components of the motor including the brushes, commutators and motor windings. Of course, the low impedance of the motor during the start operation is caused due to the lack of back e.m.f. which is generated by the motor when it is rotating. The amount of back e.m.f. is proportional to the angular speed of the armature shaft. Naturally, the mechanical and electrical strains put on the motor during the starting operation also have the undesirable effect of drastically reducing the useful life of the pump motor.

In the earlier copending U.S. Pat. application, Ser. No. 213,076, filed Dec. 28, 1971, there is described a system which eliminates the need for reversing the motor electrically. In the system described there, the pump is connected to a four port valve. The four port valve has a first port coupled to the intake of the pump, a second port coupled to the exhaust of the pump, a third port coupled to the vacuum chamber, and a fourth port which is coupled to a muffler. In operation, loading is accomplished in the first valve position by the valve connecting the first port to the third port and the second port to the fourth port. Blowback is accomplished in the second valve position in which the first port is connected to the fourth port and the second port is connected to the third port.

While the aforedescribed valving system provided great advantages over known valving systems with respect to reversal of the motor and represented a great stride in the drying art and the loading art, the present invention provides still a greater improvement in the art. The weight of the valving arrangement in the present invention is reduced from a value in the order of 25 pounds as in the aforedescribed valving arrangement to about 2 pounds. Due to the reduced weight and size of the pneumatic switch of the present invention, it is no longer necessary for the valving system to be external to the vacuum chamber dryer combination. To the contrary it is most conveniently mounted on the dryer or whatever device one desires to load.

In accordance with the present invention, a new system has been devised for effectuating the desired pneumatic drive for both the loading and blowback operations affiliated with drying particulate material in a hopper dryer. Reversal of the air circuit is accomplished through the use of a compact, light-weight pneumatic switching system which has the advantages of a system which makes it unnecessary to continually stop and start the motor while still retaining the convenient size and weight features which enable the system to be built in a single convenient package. In systems built in accordance with the present invention, the combination of the motor, pump and pneumatic switching apparatus is so small and lightweight that it is all physically located on top of the vacuum chamber.

The reversal of the air circuit is accomplished by applying the suction and pressure sides of the pump to separate chambers which are in communication with the vacuum loading chamber. Selective application of either suction or pressure as well as the venting of the unused side of the pump is achieved through the use of a switching arrangement which requires the use of only two simple rubber balls in conjunction with two pairs of holes on the two chambers. As compared with the earlier valve weighing about 25 pounds which changed the direction of air flow in the system, the pneumatic switch of the present invention weighs about two pounds. Although two-chambered four port valves are knowm, they generally have spring or resiliently mounted valve elements and therefor suffer from alignment and construction problems not experienced with the hinge mounted elements of the present invention.

Accordingly, it is an object of the invention to provide a pneumatic loading circuit in conjunction with a dryer for particulate material which is small in size, thus facilitating its placement on the body of the dryer.

Another object of the invention is to provide a vacuum loader pneumatic circuit which is light in weight, thus facilitating handling and servicing of the apparatus.

It is a further object of the present invention to provide a pneumatic circuit for a vacuum loader which accomplishes the blowback or cleaning operation without the necessity of braking and electrically reversing the pump motor.

It is a still further object of the invention to accomplish the blowback operation through the use of a pneumatic switching circuit of simple and reliable design. Reference is now made to the drawings accompanying this application.

FIG. 1 is a view partially in section of the loading vacuum chamber and the upper portion of the dryer in conjunction with the vacuum circuit and switch of the present invention.

Fig. 1A is a detail view of the vacuum chamber door mechanism.

FIG. 2 is a side view of the apparatus of the present invention and illustrates in phantom the ease with which the air circuit may be disassociated from the body of the vacuum chamber.

FIG. 3 is a top plan view of the apparatus built in accordance with the present invention.

Figure 4:
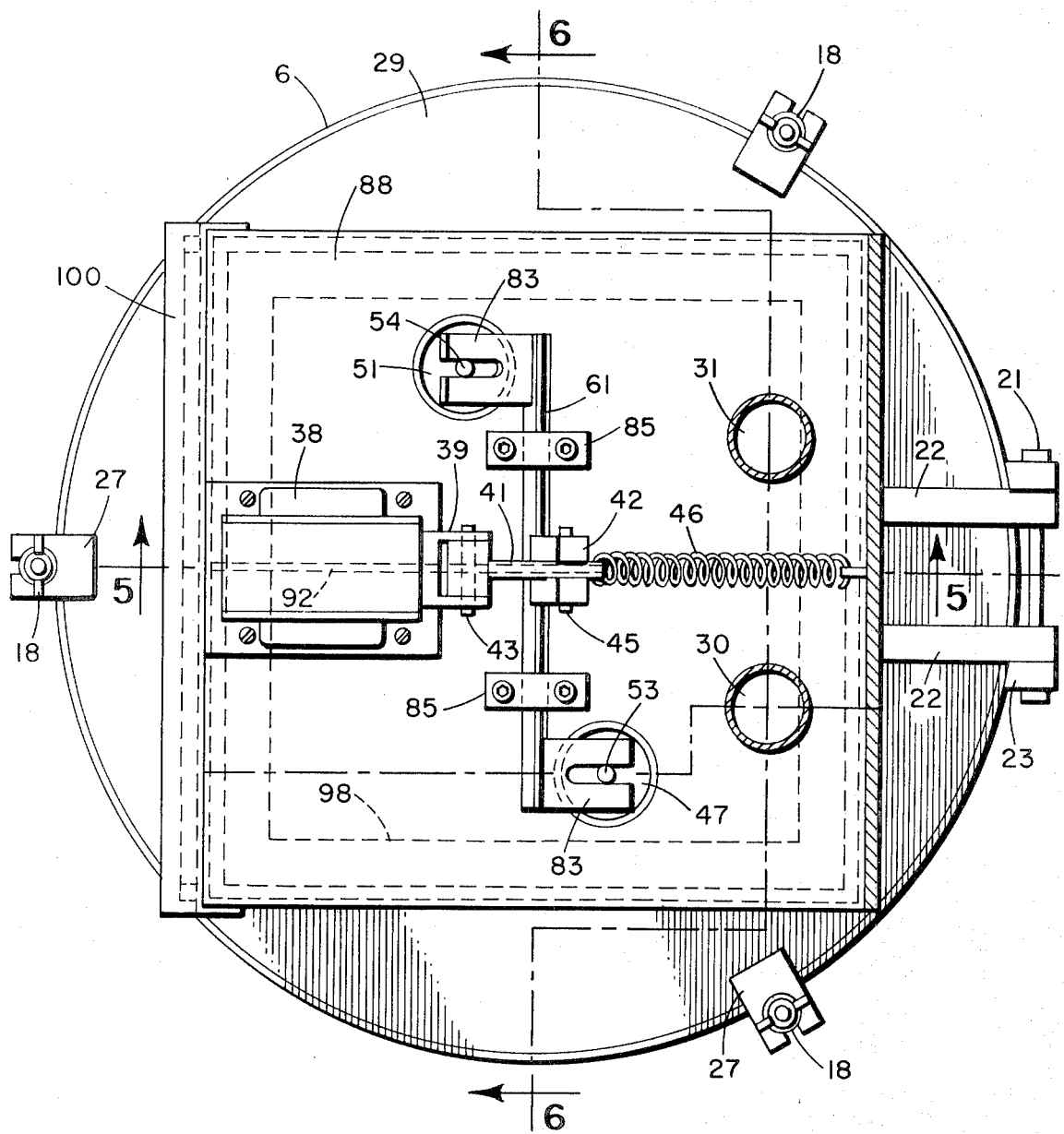
FIG. 4 is a top plan view in detail on a plane below the blower of the pneumatic switch built in accordance with the present invention.

Referring to FIG. 1, we note the presence in hopper dryer 1 of particulate material 2, which is to be dried. This drying is accomplished through the action of hot air currents which are circulated through the hopper body. When the hopper is full, switch 3 is activated by sensor arm 5, thus communicating the full condition of the dryer to the control circuit which prevents further loading. Material is introduced into the vacuum chamber 6 through material inlet duct 7. Material inlet duct 7 is connected to a source of material which is to be dried such as a gaylord. Pneumatic drive for the system is provided by blower 9, which is driven by motor 10. The pneumatic circuit is controlled through the action of pneumatic switch 11. When pneumatic switch 11 is in its load position material is drawn through inlet duct 7 through the action of the vacuum created by pump 9. Material 13 accumulates at the bottom of vacuum chamber 6. When the vacuum is released and blowback is begun through the switching of the pneumatic circuit by pneumatic switch 11, the weight of the material 13 causes the vacuum chamber door 14 to open up and release the accumulated material 13. Door 14 is maintained in its closed position through the action of a spring 16 or is counterbalanced by a weight.

Referring to FIGS. 2 and 3 we note an illustration of the ease with which the apparatus can be opened up for cleaning and servicing. The hinge opening feature is a result of the small size and light weight of this apparatus. Of major importance is the light weight of the pneumatic switch 11 which weighs about 2 pounds, in contrast with the four port switching apparatus of the earlier application, noted above, which weighed about 25 pounds. As illustrated, the entire pneumatic circuit, that is, the motor 10, the pump 9, the pneumatic switch 11 and the electro-mechanical apparatus 38, which actuates the pneumatic switch, are all mounted on the vacuum chamber body 6. The apparatus is allowed to swing open through the action of hinge 17. The hinge is composed of support elements 22 which are secured to the pneumatic drive assembly. Support elements 23 are secured to the body of the vacuum chamber 6. Rotation is provided by the insertion through support elements 22 and 23 of pin 21. An added degree of freedom in the opening of the assembly is provided through the provision in support elements 23 of an elongated hole 19, which enables one most easily to open and close the assembly. During operation, the pneumatic assembly is secured in its operating position through the use of three butterfly nuts 18 which meet with bolts 25 which are secured to the sides of vacuum chamber 6. Bolts 25 extend through slots 26 in clamp members 27 which are secured to the base 29 of the pneumatic drive assembly. The apparatus is thus provided with a simple and efficient means for service and maintenance, and such operations as replacement of the filter are accomplished with a minimum of trouble.

Figure 5:
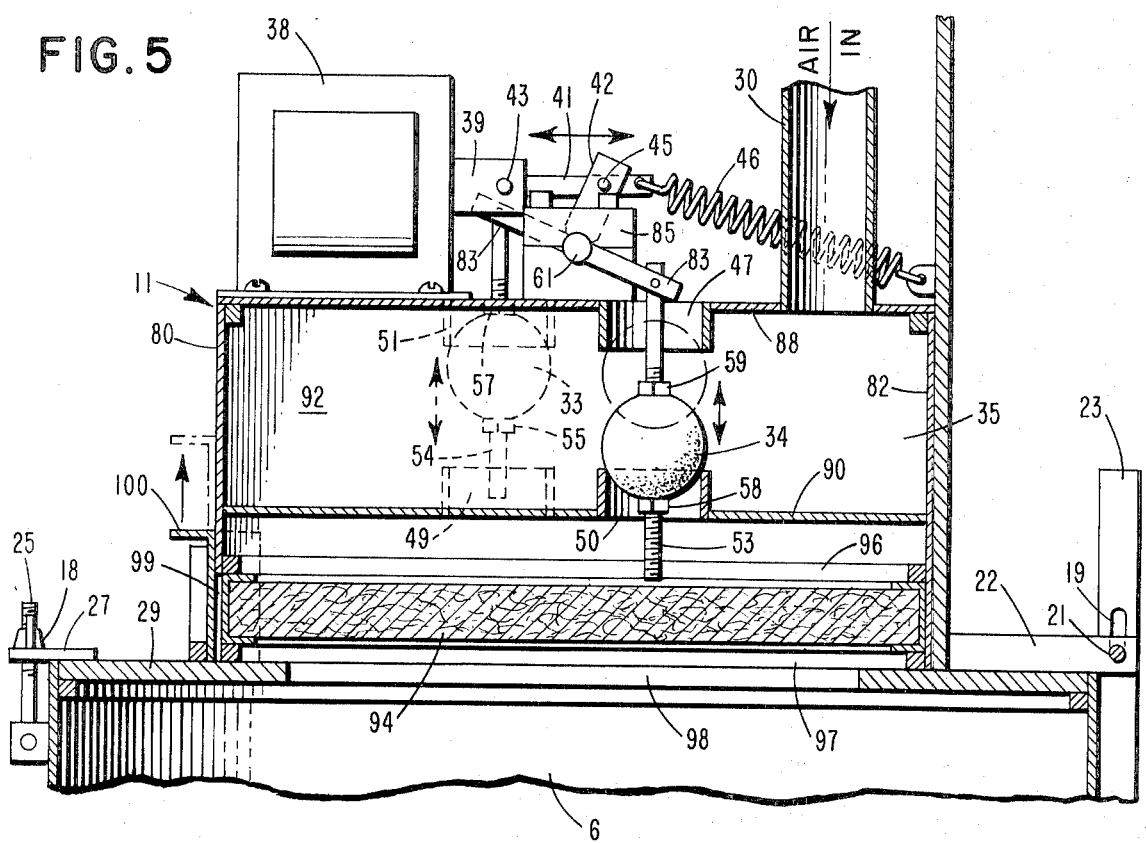
FIG. 5 is a vertical sectional view of the pneumatic circuit of the present invention taken along line 5—5 of FIG. 4.
Figure 6:
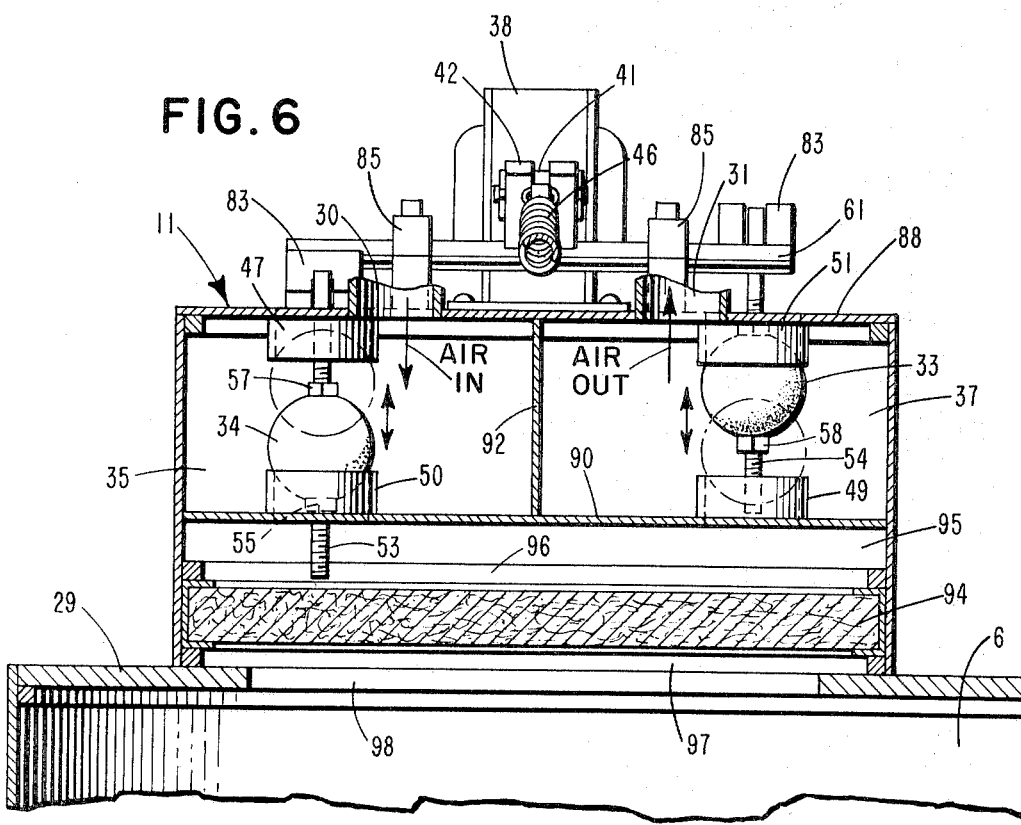
FIG. 6 is a vertical sectional view of the pneumatic switch of the present invention taken along line 6—6 of FIG. 4.

As seen in FIGS. 5 and 6, the pneumatic switch 11 is comprised of two chambers 35 and 37 which are composed of vertical sidewalls 80, 82, 84, 86, a top wall 88, a bottom wall 90, and a common vertical partition 92. Openings are formed in the top and bottom walls to connect with air inlet and outlet ports as will be described below.

FIGS. 4, 5 and 6 illustrate the pneumatic air switch and its actuating circuitry. The suction side of the pump is connected to port 31 and the pressure side of the pump is connected to port 30. In FIGS. 5 and 6 the pneumatic switch balls 33 and 34 are shown in the load position. During blowback solenoid 38 is actuated, resulting in its pulling in arm 39 and rod 41 which is pivotally secured to arm 39 and lever arm 42 by pins 43 and 45 respectively. Lever arm 42 is integral with a horizontal rod 61 which is pivotally supported on top of chambers 35 and 37. Rod 61 is connected to valve rods 53 and 54 through lever arms 83 at its opposite ends.

When the solenoid 38 is not actuated, spring 46 urges the air switch balls 33 and 34 into the loading position. During blowback, the balls are in the position indicated in phantom lines in FIG. 6. In the blowback position, switching port 47 which otherwise communicates with the atmosphere is sealed by ball 34 and switching port 49 which communicates with loading chamber 6 is sealed by ball 33. Pressure in the pressure chamber 35 is provided by the pressure side of the pump 9 which is connnected to port 30. The pressure acts through switching port 50 which is open during blowback and communicates with the vacuum chamber 6 through filter 94 disposed below filter chamber 95. Air is thus forced through filter 94, cleaning it. The suction side of the pump is still connected to port 31 and the intake of the air is provided through switching port 51. When the blowback operation has been completed, the electrical power supply is disconnected from solenoid 38 and spring 46 returns the balls to the loading position as illustrated in FIGS. 5 and 6. In the loading position, switching port 50 is sealed by ball 34 and switching port 51 is sealed by ball 33. The vacuum side of the pump is connected to port 31 which communicates with vacuum chamber 37, thus causing a vacuum to build up in chamber 37. A vacuum is thus drawn on the loading chamber 6 through port 49 and material is caused to enter the loading chamber through material inlet 7. The exhaust of the pump, during the loading operation, is connected to port 30 and is fed into pressure chamber 35 which exhausts the air through switching port 47 to the atmosphere.

As illustrated in FIG. 5, the balls 33 and 34 are mounted on threaded rods 53 and 54 and secured thereto by nuts 55, 57, 58 and 59. Threaded rods 53 and 54 are pivotally secured to lever arms 83 which are integral with rod 61 which is journaled in bearing blocks 85 mounted on top of wall 88. The filter 94 may typically be made of any conventional material such as packed fiberglass.

The filter 94 is held in chamber 95 between rails 96 and 97. Chamber 95 communicates with chamber 6 through opening 98 in base plate 29. Access to the filter is had through opening 99 in sidewall 80, which is closed by a vertically slidable door 100.

Figure 7:
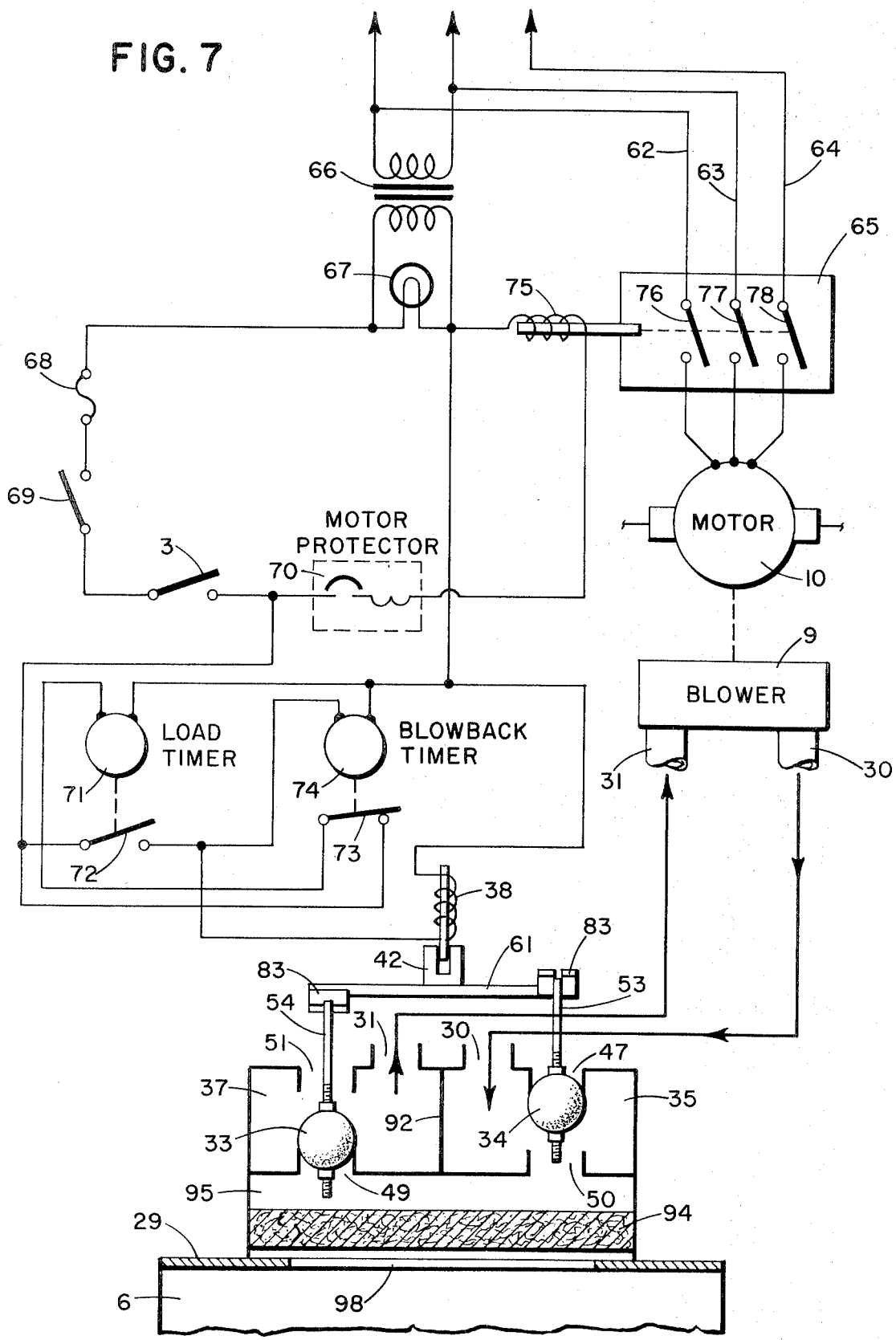
FIG. 7 is a schematic representation of the air circuit and electrical control circuitry of a pneumatic loader for particulate material built in accordance with the present invention.

Referring to FIG. 7, a schematic diagram of the apparatus built in accordance with the present invention is illustrated. Three-phase power is supplied to the motor 10 through three lines: 62, 63 and 64, which are connected to starter 65 which is connected to the motor. The three-phase power source is often of a higher voltage than is necessary to run the control circuitry. Accordingly, transformer 66 is connected to two legs of the three-phase power source and provides an output voltage of 110 volts. The presence of voltage on the output side of the transformer 66 is indicated by pilot lamp 67. The control circuit is protected by fuse 68 and is activated by switch 69, which when closed, turns on the control circuit equipment. The motor is protected by internal circuit breaker 70. When there is a need for material, hopper switch 3 is closed, causing current to flow through coil 75 of starter 65 which causes its switches 76, 77 and 78 to close and apply three-phase power to motor 10, turning on the system and starting the loading operation. When the power is applied, the loading timer 71 begins to time down. Its contacts 72 are normally open, thus electricity is supplied through the contacts 73 of blowback timer 74 to the coil 71 of the load timer. Motor 10 then drives the blower which provides the pneumatic drive for the loading operation. After the loading operation has been completed, that is, after the load timer 71 has completely timed down, its contacts 72 close thus applying electricity to the blowback timer 74 and actuating solenoid 38. Solenoid 38 then causes the pneumatic switch to blowback the filter and clean it. During the blowback portion of the loading cycle, contacts 73 of blowback timer 74 are closed. When the blowback timer has timed out, contacts 73 are opened, resulting in a loss of current through load timer 71. The loss of current through load timer 71 automatically resets load timer 71 and re-opens contacts 72. When the contacts 72 are opened the current is caused to stop flowing through the coil of blowback timer 74 and its contacts 73 are again put in the closed position and are thus reset. Current is also caused to stop flowing through solenoid 38 which results in the resetting of pneumatic switch 11 by spring 46. The pneumatic switch and its affiliated control circuitry is then back in its original loading position and loading begins again and the entire cycle is repeated until the hopper switch 3 indicates that the hopper is filled with material. The load timer may be a 60 second time delay relay which is reset by the removal of power. The blowback timer may be a 10 second time delay relay which provides a time delay beginning when power is removed from its coil.

It is understood that the former design of the invention, as shown and described herein, is to be taken merely as exemplary of the same and that various changes and modifications in the shape, size and arrangement of the components may be made without departing from the spirit and scope thereof as defined in the appended claims.

I claim:

1. In a pneumatic loader for loading particulate material from a particulate material source, said pneumatic loader having a loading chamber including a material inlet, filter means associated with said loading chamber, and means for providing pneumatic drive to said loading chamber through said filter means, the improvement comprising:

pneumatic switch means cooperating with said pneumatic drive providing means for alternately providing suction on said loading chamber for loading said particulate material from said source through said inlet into said loading chamber, or for providing pneumatic pressure to said filter means and loading chamber blowing back said filter means, said pneumatic switch means comprising:

a pneumatic vacuum chamber having a first orifice for communicating with said loading chamber, and a second orifice for communicating with outside atmosphere;

a pneumatic pressure chamber having a third orifice for communicating with said loading chamber, and a fourth orifice for communicating with said outside atmosphere; and sealing means including a first ball member alternatively positionable for sealing said second orifice or said first orifice, and a second ball member alternatively positionable for sealing said third orifice or said fourth orifice; and means for positioning said sealing means into a first position maintaiing said first ball member in sealing engagement with said second orifice while maintaining said second ball member in sealing engagement with said third orifice, and also for positioning said sealing means into a second position maintaining said first ball member in sealing engagement with said first orifice while maintaining said second ball member in sealing engagement with said fourth orifice.

2. The improvement of claim 1 wherein said first ball member comprises a first rubber ball adjustably mounted in said pneumatic vacuum chamber and wherein said second ball member comprises a second rubber ball adjustably mounted in said pneumatic pressure chamber.

3. The improvement as in claim 2 further comprising lever means for moving said balls into either said first position or said second position to achieve loading and blowback.

4. The improvement of claim 3 wherein said lever means comprises a rotatable lever coupled to said rubber balls, spring means for biasing said rubber balls toward said first position, and solenoid means for rotating said rotatable lever and maintaining said rubber balls in said second position.

5. The improvement as in claim 4 further comprising control circuit means for actuating said solenoid and controlling the time in said first and said second operative positions.

6. The improvement as in claim 5 further comprising a first timer for controlling the time that said sealing means is in said first operative position and second timer means for controlling the time that said sealing means is in said second operative position.

7. A pneumatic loading apparatus for loading particulate material from a particulate material source comprising:
a loading chamber having inlet means for receiving said particulate material from said particulate material source;
filter means;
a filter chamber for housing said filter means, said filter chamber mounted on said loading chamber and communicating therewith through said filter means;
pneumatic switch means comprising a pressure chamber and a vacuum chamber, both said vacuum and pressure chambers communicating directly with said filter chamber;
first orifice means in said vacuum chamber for communicating with said loading chamber;
second orifice means in said vacuum chamber for communicating with the outside atmosphere surrounding said pneumatic switch means;
third orifice means in said pressure chamber for communicating with said loading chamber;
fourth orifice means in said pressure chamber for communicating with said outside atmosphere;
means for providing pneumatic pressure to said pressure chamber and pneumatic suction to said vacuum chamber;
bistable sealing means disposed within said pressure and vacuum chambers for sealing said second orifice means and said third orifice means in a first operative position for pneumatically loading said particulate material into said loading chamber, and for alternately sealing said first orifice means and said fourth orifice means in a second operative position for blowing back and cleaning said filter means; and
means for alternating said bistable sealing means from one of said operative positions to the other of said operative positions.

8. Apparatus as in claim 7 wherein said sealing means comprises a first rubber ball positionable in said vacuum chamber and a second rubber ball positionable in said pressure chamber for alternately sealing said second and third orifice means or said first and fourth orifice means.

9. Apparatus as in claim 7 wherein said alternating means comprises rotatable lever means connected to said bistable sealing means,
resilient means for biasing said bistable sealing means toward said first operative position, and solenoid means for rotating said lever means and moving said bistable sealing means to said second operative position.

10. Apparatus as in claim 9 further comprising control circuit means for actuating said solenoid means and controlling the time in said first and said second operative positions.

11. Apparatus as in claim 10 further comprising a first timer for controlling the time that said sealing means is in said first operative position and second timer means for controlling the time that said sealing means is in said second operative position.

* * * * *